(12) United States Patent
Lindahl et al.

(10) Patent No.: US 7,831,746 B2
(45) Date of Patent: Nov. 9, 2010

(54) DIRECT MEMORY ACCESS ENGINE FOR DATA TRANSFERS

(75) Inventors: Christopher D. Lindahl, Eau Claire, WI (US); Teruo Utsumi, Los Gatos, CA (US)

(73) Assignee: SGI International, Inc., Fremont, CA (US)

( * ) Notice: Subject to any disclaimer, the term of this patent is extended or adjusted under 35 U.S.C. 154(b) by 0 days.

(21) Appl. No.: 11/685,750

(22) Filed: Mar. 13, 2007

(65) Prior Publication Data

US 2008/0228958 A1 Sep. 18, 2008

(51) Int. Cl.
*G06F 13/28* (2006.01)
(52) U.S. Cl. .............................. 710/22; 710/23; 710/26
(58) Field of Classification Search .................. 710/22, 710/23, 26
See application file for complete search history.

(56) References Cited

U.S. PATENT DOCUMENTS

| 6,487,654 | B2 | 11/2002 | Dowling |
| 2002/0052993 | A1* | 5/2002 | Dowling ..................... 710/260 |
| 2008/0126612 | A1* | 5/2008 | Barrow et al. ................. 710/34 |
| 2008/0177909 | A1* | 7/2008 | Sapp et al. .................... 710/27 |

* cited by examiner

*Primary Examiner*—Niketa I Patel
*Assistant Examiner*—Zachary K Huson
(74) *Attorney, Agent, or Firm*—Sunstein Kann Murphy & Timbers LLP

(57) ABSTRACT

A system and method of transferring data of unknown length in a computer system includes providing an embedded device having a processing apparatus and a DMA engine, the processing apparatus processing the data and the DMA engine transferring the data from the embedded device to a component in the computer system, determining whether information from the embedded device is an address value or a data value, programming the DMA engine with the address value if the information is the address value, and transferring the data value to the address value in the component if the information is the data value.

22 Claims, 5 Drawing Sheets

DIRECT MEMORY ACCESS ENGINE FOR DATA TRANSFERS

FIELD OF THE INVENTION

The invention generally relates to data transfers, and more particularly, the invention relates to data transfers with direct memory access engines.

BACKGROUND OF THE INVENTION

Direct memory access (DMA) allows data to be sent to or received from a computer's memory without the computer's microprocessor being involved with the data transfer. This allows the speed and bandwidth of the data transfer process to be increased. For some types of data transfers, DMA engines may be used to perform the data transfer process. However, input from the computer's microprocessor may still be required to provide the parameters for programming the DMA engine, such as a start address and transfer length. There are some applications like compression/decompression, encryption/decryption and search algorithms in which the transfer length is unknown at the beginning of the transfer. These kinds of transfers are generally broken into multiple DMA transfers of a known length, slowing down the overall transfer process.

During the DMA transfer, the computer's microprocessor may also still be involved to determine when the DMA engine completes the transfer. For example, the DMA engine may write to a register when it completes the transfer and the microprocessor may need to continuously poll the register to determine when the transfer is complete. Alternatively, the DMA engine may send an interrupt to the microprocessor upon completion letting it know that the transfer is complete. For multiple DMA transfers, the time to execute the transfer is lengthened due to the microprocessor's recurring involvement upon the completion of each individual transfer.

SUMMARY OF THE INVENTION

In accordance with one aspect of the invention, a method of transferring data of unknown length in a computer system includes providing an embedded device having a processing apparatus and a DMA engine, the processing apparatus processing the data and the DMA engine transferring the data from the embedded device to a component in the computer system, determining whether information from the embedded device is an address value or a data value, programming the DMA engine with the address value if the information is the address value, and transferring the data value to the address value in the component if the information is the data value.

In accordance with related embodiments, the embedded device may be a field programmable gate array. The embedded device may program the DMA engine. Data from the embedded device may be stored in local memory of the embedded device. The data from the embedded device may be stored in a buffer of the embedded device. The component may be memory or a field programmable gate array in the computer system. The method may further include incrementing the address value in the DMA engine to provide a next address location if the information is the data value, wherein incrementing the address value in the DMA engine may occur after transferring the data value to the address value in the component. The method may further include determining whether the data value is a last data value. The method may further include signaling that the DMA engine is complete if the data value is the last data value.

In accordance with another aspect of the invention, a system for transferring data of unknown length in a computer system includes a component having an address, an I/O interface in communication with the memory, an embedded device in communication with the I/O interface, the embedded device including a processing apparatus and a DMA engine, the processing apparatus having program code for processing the data and program code for programming the DMA engine with the address of the component, the DMA engine transferring the data from the embedded device to the address in the component.

In accordance with related embodiments, the embedded device may be a field programmable gate array. The embedded device may further include local memory for storing the data. The embedded device may further include a buffer for buffering the data. The component may be memory or a field programmable gate array. The processing apparatus may further include program code for incrementing an address location in the component.

In accordance with another aspect of the invention, a method of transferring data in a computer system includes providing an embedded device having a processing apparatus and a DMA engine, the processing apparatus processing the data and the DMA engine transferring the data from the embedded device to a component in the computer system, programming the DMA engine with a start address and a transfer length, the start address and the transfer length provided by the embedded device, and transferring the data to the start address in the component.

In accordance with another aspect of the invention, a computer program product for transferring data of unknown length in a computer system includes a computer usable medium having computer readable program code thereon. The computer system includes an embedded device having a program apparatus and a DMA engine, the program apparatus processing the data and the DMA engine transferring the data from the embedded device to a component in the computer system. The computer readable program code including program code for determining whether information from the embedded device is an address value or a data value, program code for programming the DMA engine with the address value if the information is the address value, and program code for transferring the data value to the address value in the component if the information is the data value.

In accordance with related embodiments, the embedded device may be a field programmable gate array. The computer program product may further include program code for signaling that the DMA engine is complete. The component may be memory or a field programmable gate array.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

Embodiments of the present invention provide a system and method for transferring data that includes an embedded device having a DMA engine and a processing apparatus capable of programming the DMA engine. In addition, embodiments involve logic and a protocol to enable a single DMA transfer to occur when the final transfer size is unknown at the initiation of the transfer. This allows greater bandwidth and lower latency for data transfers of unknown size. Embodiments also allow the DMA engine to complete the data transfer and possibly begin a new data transfer without involvement from the microprocessor.

Figure 1:
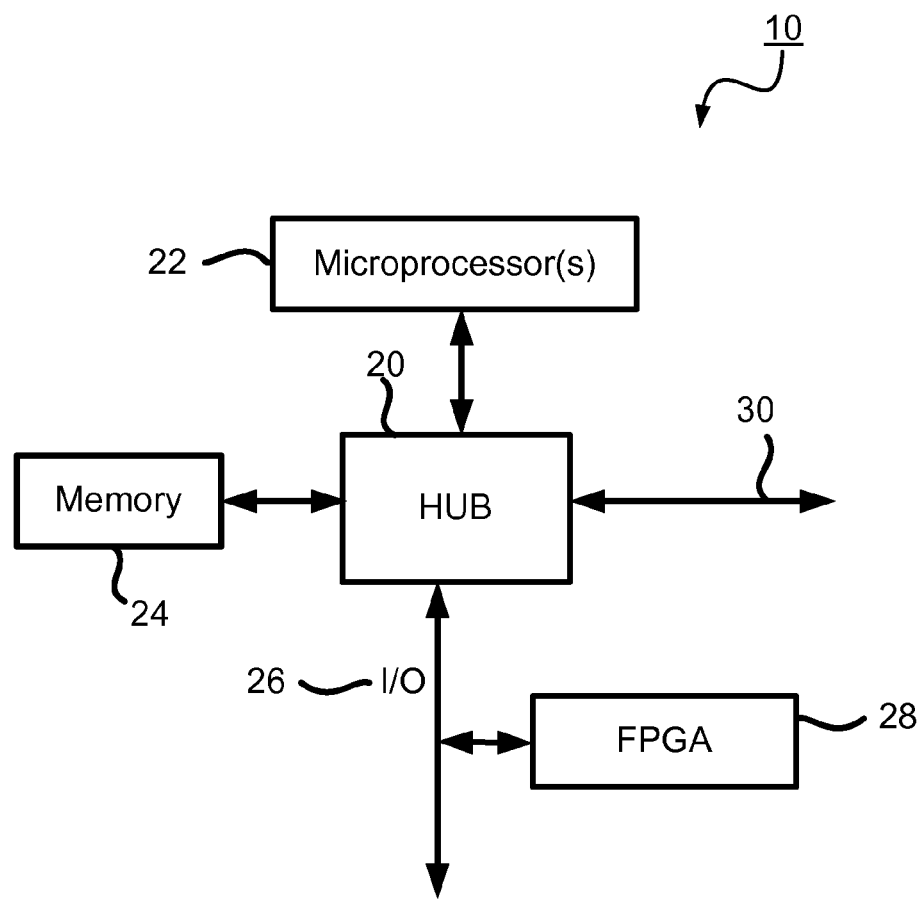
FIG. 1 shows a computer system according to an embodiment of the present invention.

FIG. 1 schematically shows a computer system that may be used in embodiments of the present invention. As shown, the computer system 10 may have a plurality of components coordinated by a HUB chip 20, e.g., a gate array chip and/or a microprocessor, customized to perform a number of functions. The components coupled with the HUB chip 20 may include one or more microprocessors 22 for generating data words, among other things, memory 24 for storing data, and an I/O interface 26 for communicating with devices that are external to the computer system 10. An embedded device, such as a field programmable gate array (FPGA) 28, for processing data from the memory 24, among other things, may be coupled to the I/O interface 26. In addition, other embedded devices may be used instead of, or in addition to, the FPGA (e.g., configurable devices such as Programmable Array Logic devices (PAL), and Complex Programmable Logic Devices (CPLD)). The FPGA 28 may be reconfigured via software to assist different applications at various times. The computer system shown in FIG. 1 may be one node in a multi-node computer system. Accordingly, the computer system 10 may include an interconnect 30 to other nodes within the multi-node computer system. The other nodes may have similar components or may have different components or configurations to that shown in FIG. 1. Microprocessor(s) on the various nodes in the multi-node computer system may cooperate to perform a common task. For example, at least one of the microprocessors on each of the nodes may share responsibilities with those on other nodes, e.g., for multiplying complex matrices. It should be noted that discussion of a specific computer system as shown in FIG. 1 is exemplary and thus, not intended to limit any aspect of the present invention. Accordingly, although the computer system 10 has been shown as having certain components, it will be apparent to those skilled in the art that different components and/or configurations may be used in embodiments of the present invention.

Figure 2:
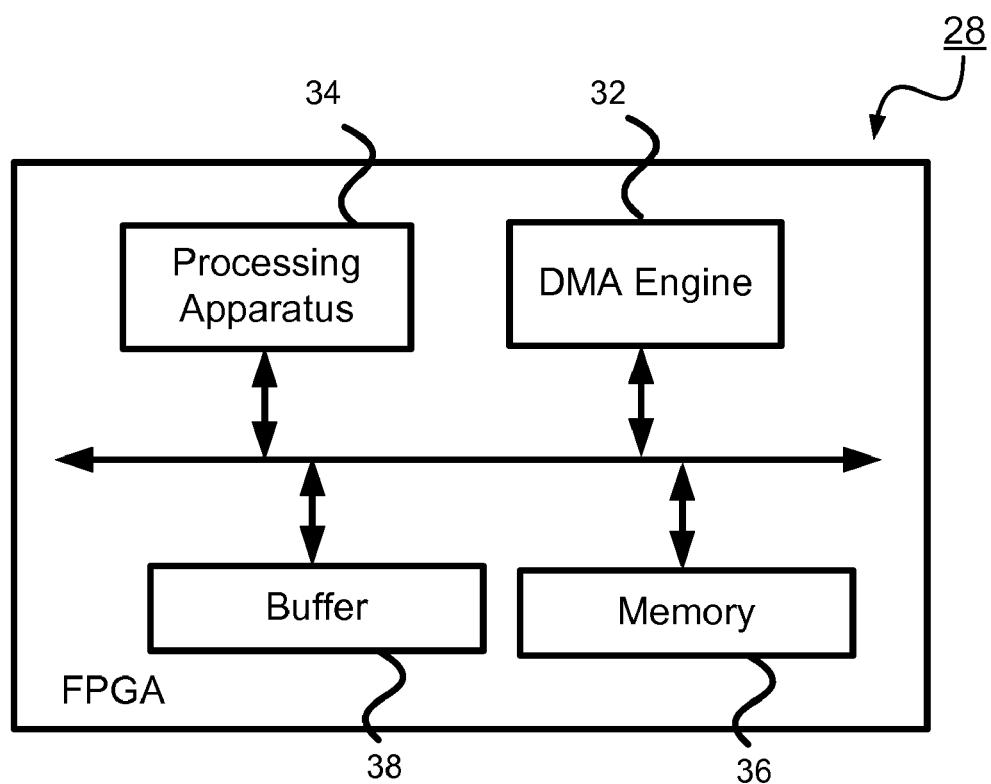
FIG. 2 shows an FPGA according to an embodiment of the present invention.
Figure 3:
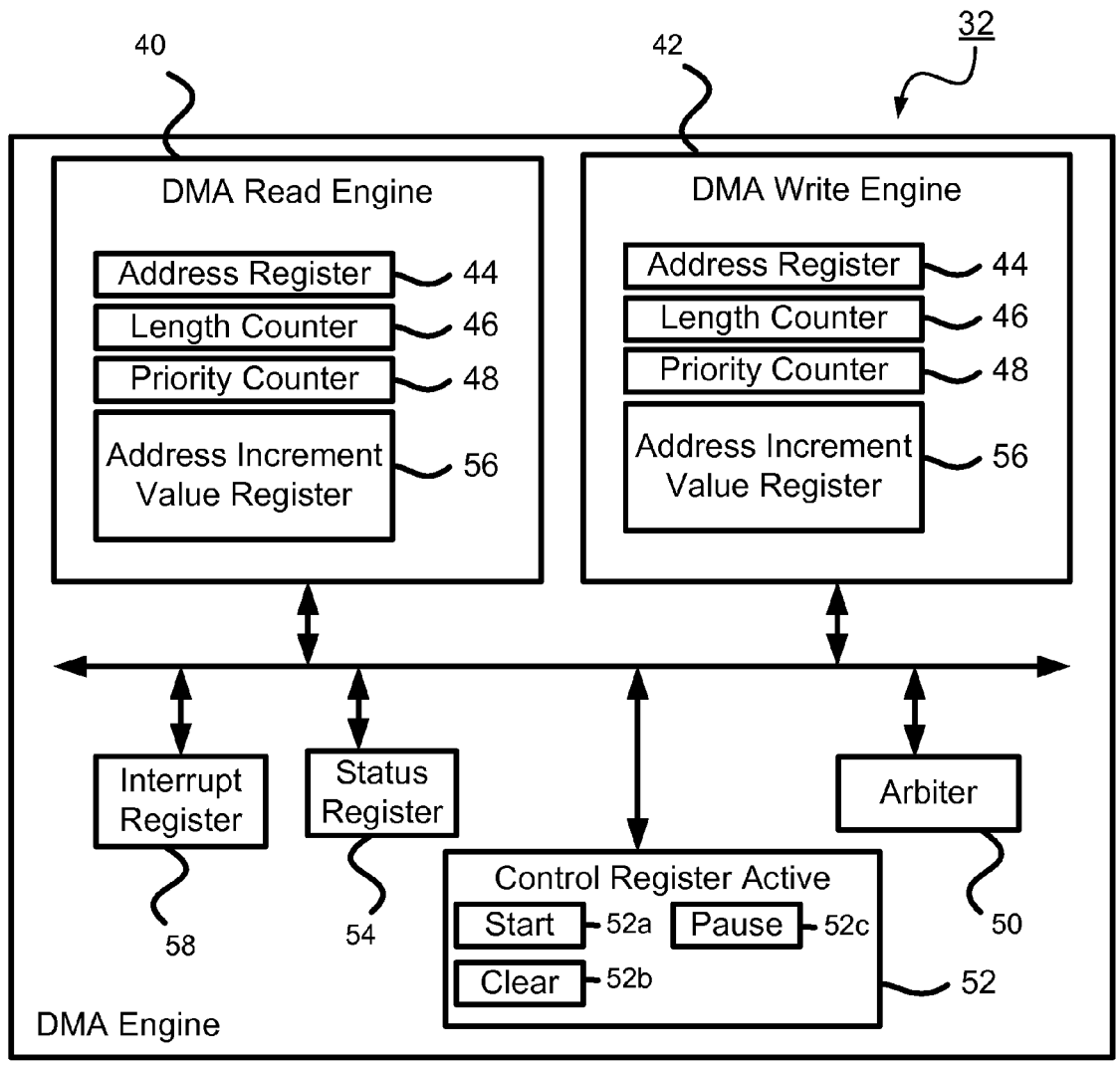
FIG. 3 shows a DMA engine according to an embodiment of the present invention.

FIG. 2 schematically shows an FPGA according to an embodiment of the present invention. The FPGA 28 may include a DMA engine 32 for performing data transfers to and from the memory 24, a processing apparatus 34 for processing the data and providing programming parameters to the DMA engine 32, local memory 36 for optionally storing the data received from or being sent to the memory 24, and a buffer 38 (such as a first-in-first-out "FIFO" buffer) for temporarily storing the data received from or being sent to the memory 24. Referring also to FIG. 3, the DMA engine 32 may include one or more read DMA engines 40 where the data is read from the memory 24 and passed to the processing apparatus 34 for processing. The DMA engine 32 may also include one or more write DMA engines 42 where the data is sent from the processing apparatus 34 to the memory 24. In both instances, the DMA engine 32 passes the data from the memory 24 directly to the processing apparatus 34 or vice versa. The DMA engine 32 does not need to send the data to local memory 36 before the processing apparatus 34 may begin processing. However, the processing apparatus 34 may optionally store the incoming data or the resulting processed data to its local memory 36. The programming parameters for each of the DMA read and write engines 40, 42 may include an address stored in an address register 44 for the DMA engine 32 to send the data to or retrieve the data from the memory 24. Further details of the address register 44 are discussed below. Programming parameters may also include a transfer length or count stored in a length counter 46 for the data being sent to or retrieved from the memory 24. Each of the read and write DMA engines 40, 42 may also have a priority counter 48 so that a priority may be established among the various DMA engines 40, 42. The read and write DMA engines 40, 42 may function independently and may operate concurrently. There may be an arbiter 50 for arbitration to enable the fair distribution of the various DMA engines 40, 42 over the I/O interface 26. The arbiter 50 may use the information stored in the priority counter 48 from each of the DMA read and write engines 40, 42 to determine the priority. Although the above discussion has referred to the DMA engine 32 as transferring data to or from the memory 24, it will be apparent to those skilled in the art that the DMA engine 32 may transfer data to/from any component in the computer system that has an address (e.g., that may store or process data). For example, the DMA engine 32 may transfer data to/from another FPGA for further processing or, in a multi-node computer system, may transfer data to/from memory in another node. Accordingly, the various DMA read and write engines 40, 42 may be programmed with any system or network address or storage address in the system.

Figure 4:
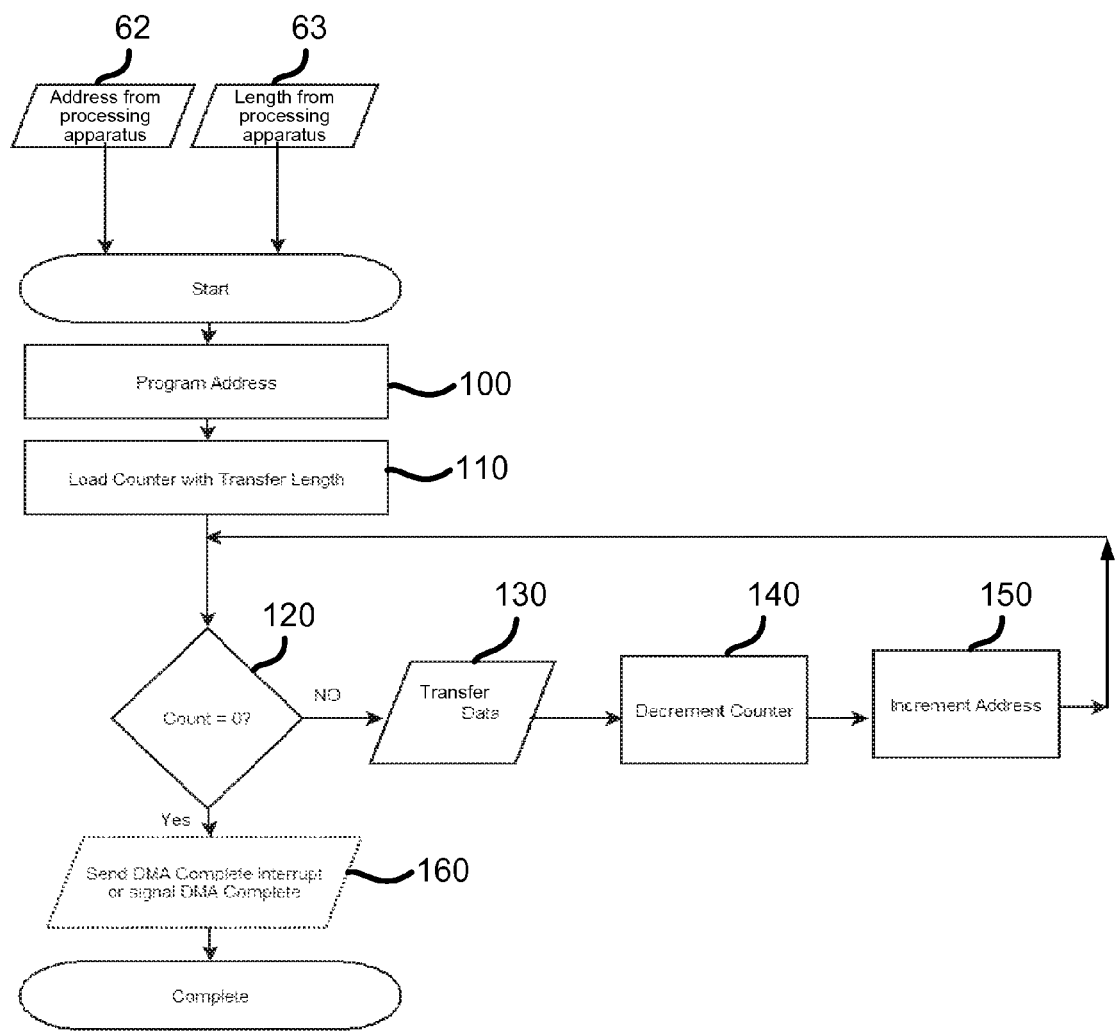
FIG. 4 shows a method for initiating a DMA engine and transferring data according to an embodiment of the present invention.

Embodiments of the present invention may be implemented in a variety of ways. FIG. 4 shows one method for initiating a DMA engine and transferring data according to an embodiment of the present invention. In some cases, the processing apparatus 34 or embedded device 28 may determine the address of the data that it wishes to access. The processing apparatus 34 or embedded device 28 may determine the address by computing the address based on data received, the address may be contained within the data received, or the address may be passed from another component of the computer system. The data may be received from the memory 24, the microprocessor 22, memory or a microprocessor in another node, and/or another FPGA. Previously, this address would need to be passed back to the microprocessor 22 and the microprocessor 22 would then write that address into the DMA engine, provide a length or count for the data, and then start the DMA action. In embodiments of the present invention, the processing apparatus 34 is capable of programming the DMA engine 32 autonomously, providing a more efficient process of initiating the DMA action. Referring to FIG. 4, the process begins by programming the DMA engine 32 with the address value 62 received from the processing apparatus 34 (step 100). This address 62 may be an address in another FPGA (e.g., in the FPGA's local memory or in a buffer), in memory 24, or in memory of another node. In step 110, a length counter 46 in the DMA engine 32 is loaded with the transfer length 63 also received from the processing apparatus 34. In step 120, the DMA engine 32 verifies whether the transfer length value 63 in the length counter 46 is zero. If the value 63 in the length counter 46 is greater than the zero, then the DMA engine 32 transfers the data to or from the address, e.g., in memory 24, that is indicated in the address register 44 (step 130), decrements the value 63 in the length counter 46 (step 140) and increments the address value 62 in the address register 44 to the next address location (step 150). The DMA engine 32 continues with step 120 through step 150 until the value 63 in the length counter 46 is zero. When the counter 46 is zero, the DMA engine 32 may send an interrupt to the microprocessor 22 or otherwise signal that the DMA transfer is complete (step 160).

Although this method reduces some of the initial communication between the microprocessor 22 and the DMA engine 32, the length 63 or amount of the data to be transferred must be known at the beginning of the DMA action. As mentioned before, with certain algorithms (e.g. compression/decompression, encryption/decryption, searches, for example in DNA sequence listings), the size of the output or data may not be known until the processing apparatus 34 has run to completion. This may require the processing apparatus 34 to wait before transferring some of the data until it can compute the final size, or alternatively, to provide a way to abort a pending DMA engine. In embodiments of the present invention, the processing apparatus 34 may give a start address 62 followed by the data without giving the length 63 or byte count of the data. The DMA engine 32 may then continue to increment the address by a given value until the FPGA 28 indicates that it has sent all of the data.

Figure 5:
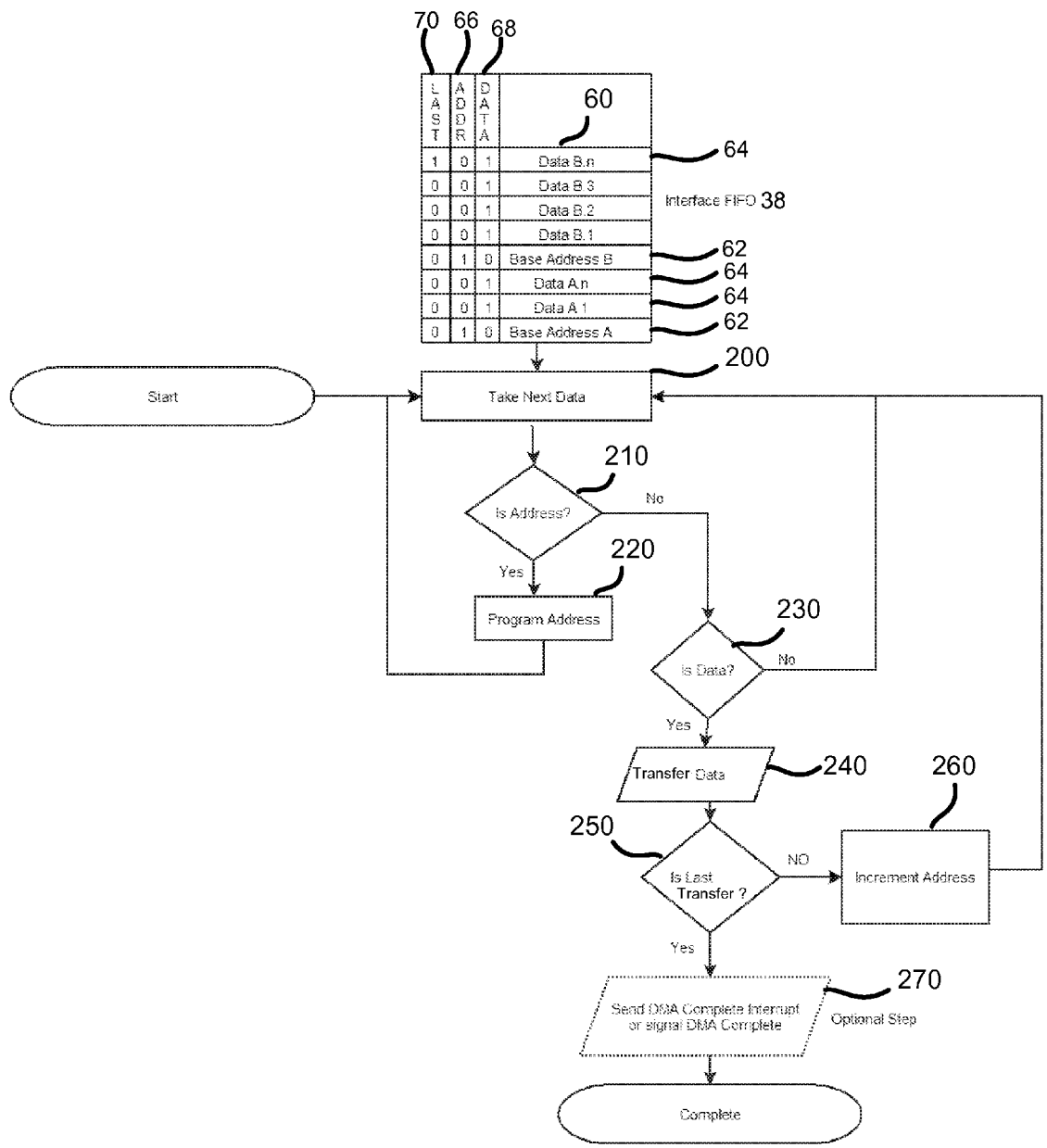
FIG. 5 shows a method for initiating a DMA engine and transferring data of unknown length according to an embodiment of the present invention.

FIG. 5 shows a method for initiating a DMA engine and transferring data of unknown length according to an embodiment of the present invention. The process begins by the processing apparatus 34 sending the DMA engine 32 information 60 (step 200). In step 210, the DMA engine 32 verifies whether the information 60 sent is an address value 62 or a data value 64. This may be done by setting a flag register 66 that the information 60 is an address value 62 or setting a flag register 68 that the information 60 is a data value 64. If the information 60 is an address 62, then the DMA engine 32 programs the address 62 as the start address in the address register 44 for a DMA transfer (step 220). This address may be an address in another FPGA (e.g., in the FPGA's local memory 36 or in a buffer, such as a first-in-first-out (FIFO) buffer), in memory 24, or in memory of another node. The DMA engine 32 then takes the next information 60 sent by the processing apparatus 34 (step 200) and verifies whether the information 60 sent is an address value 62 or data value 64 (step 210). If the information 60 is data 64 (step 230), the DMA engine 32 transfers the data 64 to the address, e.g., in memory 24, that is indicated in the address register 44 (step 240). The DMA engine 32 then verifies whether the information 60 sent is the last transfer of information 60 (step 250). If not, the DMA engine 32 increments the address value 62 in the address register 44 to the next address location (step 260) and then takes the next information 60 sent by the processing apparatus 34 (step 200). The processing apparatus 34 may indicate that the information 60 is the last transfer of information in two ways. The processing apparatus 34 may just send a new address value 62 to the DMA engine 32 in step 200. The DMA engine 32 then begins a new data transfer without any involvement from the microprocessor 22. Alternatively, the processing apparatus 34 may send an indication with or after the last transfer of information 60 in step 250, such as setting a flag register 70, that the data transfer is complete. The DMA engine 32 may then send an interrupt to the microprocessor 22 or otherwise signal that the DMA transfer is complete (step 270).

In order to accomplish these processes, the DMA engine 32 may include a number of registers. Referring again to FIG. 3, for example, the DMA engine 32 may include an Address Register 44 that may either be programmed by the microprocessor 22, or it may be written by the FPGA 28 when provided with an address value 62 from the processing apparatus 34. The register 44 may hold the address value that may be accessed in the memory 24, in another FPGA (e.g., in the FPGA's local memory or in a buffer), or in memory of another node. The register 44 may be read by the FPGA 28 and incremented to point to the next address to access. This may be a 53-bit register.

The DMA engine 32 may also include a DMA Control Register Active 52 when the microprocessor 22 is controlling the DMA engine 32. Fields such as start 52*a*, clear 52*b*, and pause 52*c* may enable the microprocessor 22 to control the flow of data from the DMA engine 32. This register 52 may not be used when the processing apparatus 34 initiates the DMA engine 32. In that case, these actions may be implied by the data flow and controlled by the processing apparatus 34.

The DMA engine 32 may also include a DMA Status Register 54 for providing feedback and information to the microprocessor 22 application. The register 54 may provide information such as a bit to indicate that the DMA is active, a bit to indicate that it is complete, an error indicator, and error or status codes.

Each of the DMA read and write engines 40, 42 may also include an Address Increment Value Register 56 that may contain a programmable value to be used as the incremental value applied to the address value 62 in the address register 44 to be accessed. The DMA engine 32 may also include Interrupt Registers 58. The interrupts may be sent to the microprocessor 22 upon DMA completion or DMA errors. The DMA engine 32 may also include a register to store an interrupt vector (location) and an additional register may be used to enable or disable the use of the interrupts (not shown). Although the Control Register Active 52, the Status Register 54, and Interrupt Register 58 are shown within the DMA Engine 32, one or more of these registers may be provided within one or more of the DMA read and write engines 40, 42, or may be provided in both the DMA Engine 32 and within one or more of the DMA read and write engines 40, 42.

In one exemplary computer system, the microprocessors 22 include two 4X-ITANIUM microprocessors (distributed by Intel Corporation, Santa Clara, Calif.) that generate 128 bit words for storage in a plurality of dual in-line memory modules (DIMM) shown schematically as memory 24 in FIG. 1. Each DIMM illustratively has eighteen X4-type random access memory chips, e.g., DRAM chips, for storing data generated by the microprocessors 22, and is connected to one of four 72 bit buses (not shown). Accordingly, HUB chip 20 may transfer 72 bits of data across each bus per clock cycle. The buses illustratively operate independently and transmit data in a synchronized manner. The exemplary computer system may also include two FPGAs 28 each having five read DMA engines and five write DMA engines and each having a plurality of local memory 36, such as static random access memory (SRAM) or double data rate-synchronous dynamic random access memory (DDR-SDRAM).

Embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as pre-programmed hardware elements, other related components, or as a combination of hardware and software components.

Embodiments may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions may be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Some embodiments of the invention may be implemented as hardware, software (e.g., a computer program product), or a combination of both software and hardware.

Although various exemplary embodiments of the invention have been disclosed, it should be apparent to those skilled in the art that various changes and modifications can be made which will achieve some of the advantages of the invention without departing from the true scope of the invention.

What is claimed is:

1. A method of transferring data of unknown length in a computer system, the method comprising:
    providing an embedded device having a processing apparatus and a Direct Memory Access (DMA) engine, the processing apparatus configured to process the data and configured to program parameters to the DMA engine, the programming parameters including an address of a component in the computer system, and the DMA engine configured to transfer the data from the embedded device to the component;
    determining whether information from the embedded device is an address value or a data value;
    based on the determination, programming the address of the component in the DMA engine with the address value if the information is the address value; and
    based on the determination, transferring the data value to the address of the component if the information is the data value.

2. The method of claim 1, wherein the embedded device is a field programmable gate array.

3. The method of claim 1, wherein the embedded device programs the DMA engine.

4. The method of claim 1, wherein the data from the embedded device is stored in local memory of the embedded device.

5. The method of claim 1, wherein the data from the embedded device is stored in a buffer of the embedded device.

6. The method of claim 1, wherein the component is memory or a field programmable gate array in the computer system.

7. The method of claim 1 further comprising:
    incrementing the address in the DMA engine to provide a next address location if the information is the data value, wherein incrementing the address in the DMA engine occurs after transferring the data value to the address of the component.

8. The method of claim 1 further comprising:
    determining whether the data value is a last data value.

9. The method of claim 8 further comprising:
    signaling that the DMA engine is complete, if the data value is the last data value.

10. A system for transferring data of unknown length in a computer system, the system comprising:
    a component having an address;
    an I/O interface in communication with the component;
    an embedded device in communication with the I/O interface, the embedded device including a processing apparatus and a DMA engine, the processing apparatus having program code for processing the data and program code for programming the DMA engine with the address of the component, the DMA engine configured to transfer the data from the embedded device to the address in the component; and
    a microprocessor configured to receive a signal from the DMA engine when transferring the data is complete, the microprocessor in communication with the embedded device over the I/O interface.

11. The system of claim 10, wherein the embedded device is a field programmable gate array.

12. The system of claim 10, wherein the embedded device further comprises local memory for storing the data.

13. The system of claim 10, wherein the embedded device further comprises a buffer for buffering the data.

14. The system of claim 10, wherein the component is memory or a field programmable gate array.

15. The system of claim 10, wherein the processing apparatus further comprises program code for incrementing the address in the DMA engine.

16. A method of transferring data in a computer system, the method comprising:
    providing an embedded device having a processing apparatus and a DMA engine, the processing apparatus configured to process the data and configured to provide programming parameters to the DMA engine, and the DMA engine configured to transfer the data from the embedded device to a component in the computer system;
    providing a microprocessor configured to receive a signal from the DMA engine when transferring the data is complete, the microprocessor in communication with the embedded device over an I/O interface;
    programming the DMA engine with a start address and a transfer length, the start address and the transfer length provided by the embedded device; and
    transferring the data to the start address in the component.

17. A computer program product for transferring data of an unknown length in a computer system, the computer system including an embedded device having a processing apparatus and a DMA engine, the processing apparatus configured to process data and configured to provide programming parameters to the DMA engine, the programming parameters including an address of a component in the computer system and the DMA engine configured to transfer the data from the embedded device to the component, the computer program product comprising a computer readable medium having computer readable program code stored thereon, the computer readable program code comprising:
    program code for determining whether information from the embedded device is an address value or a data value;

program code for programming the address of the component in the DMA engine with the address value if the information is the address value; and program code for transferring the data value to the address of the component if the information is the data value.

18. The computer program product of claim 17, wherein the embedded device is a field programmable gate array.

19. The computer program product of claim 17 further comprising:

program code for signaling that the DMA engine is complete.

20. The computer program product of claim 17, wherein the component is memory or a field programmable gate array.

21. The method of claim 1, further comprising:

providing a microprocessor configured to receive a signal from the DMA engine when transferring the data is complete, the microprocessor in communication with the embedded device over an I/O interface.

22. A method of transferring data of unknown length in a computer system, the method comprising:

providing an embedded device having a processing apparatus and a Direct Memory Access (DMA) engine, the processing apparatus configured to process the data and configured to provide programming parameters to the DMA engine, the programming parameters including an address of a component in the computer system, and the DMA engine configured to transfer the data from the embedded device to the component;

providing a microprocessor configured to receive a signal from the DMA engine when transferring the data is complete, the microprocessor in communication with the embedded device over an I/O interface;

determining whether information from the embedded device is an address value or a data value;

based on the determination, programming the address of the component in the DMA engine with the address value if the information is the address value; and based on the determination, transferring the data value to the address of the component if the information is the data value.

* * * * *